(12) United States Patent
Xu et al.

(10) Patent No.: US 9,641,310 B2
(45) Date of Patent: May 2, 2017

(54) NETWORK ASSISTED INTERFERENCE CANCELLATION SIGNALING

(71) Applicant: QUALCOMM Incorporated, San Diego, CA (US)

(72) Inventors: Hao Xu, San Diego, CA (US); Wanshi Chen, San Diego, CA (US); Tao Luo, San Diego, CA (US); Peter Gaal, San Diego, CA (US); Yongbin Wei, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 124 days.

(21) Appl. No.: 14/536,830

(22) Filed: Nov. 10, 2014

(65) Prior Publication Data

US 2015/0172035 A1  Jun. 18, 2015

Related U.S. Application Data

(60) Provisional application No. 61/916,037, filed on Dec. 13, 2013, provisional application No. 61/916,108, filed on Dec. 13, 2013.

(51) Int. Cl.
*H04W 4/00* (2009.01)
*H04L 5/00* (2006.01)
(Continued)

(52) U.S. Cl.
CPC .......... *H04L 5/0073* (2013.01); *H04J 11/005* (2013.01); *H04W 72/048* (2013.01); *H04W 72/082* (2013.01)

(58) Field of Classification Search
USPC .......... 370/252–278, 312–352; 455/452–507
See application file for complete search history.

(56) References Cited

U.S. PATENT DOCUMENTS 9,019,924 B2 *  4/2015  Ng ...................... H04W 72/042
                                              370/329
2010/0285810 A1   11/2010  Ko et al.
(Continued)

FOREIGN PATENT DOCUMENTS

WO    WO-2013133747 A2    9/2013

OTHER PUBLICATIONS

Alcatel-Lucent et al., "On macro-assisted interference suppression/cancellation", 3GPP Draft; R1-132036-REL-12 UMTS HETNET—On Macro-Assisted Interference Cancellation V0.2, 3rd Generation Partnership Project (3GPP), Mobile Competence Centre; 650, Route Des Lucioles; F-06921 S, vol. RAN WG1, No. Fukuoka, Japan; May 20, 2013-May 24, 2013, May 11, 2013 (May 11, 2013),pp. 1-3, XP050697819, Retrieved from the Internet: URL:http://www.3gpp.org/ftp/tsg_ran/WG1_RL1/TSGR1_73/Docs/ [retrieved on May 11, 2013].
(Continued)

*Primary Examiner* — Man Phan
(74) *Attorney, Agent, or Firm* — Patterson & Sheridan, L.L.P.

(57) ABSTRACT

Aspects of the present disclosure relate to techniques for network assisted interference cancellation (NAIC). An example method generally includes receiving network assisted interference cancellation (NAIC) information from a potentially interfering neighbor base station, and performing interference cancellation, suppression or mitigation when processing a signal from a serving base station using the NAIC information.

23 Claims, 9 Drawing Sheets

(51) Int. Cl.
*H04W 72/04* (2009.01)
*H04W 72/08* (2009.01)
*H04J 11/00* (2006.01)

(56) References Cited

U.S. PATENT DOCUMENTS

| | | | | |
|---|---|---|---|---|
| 2012/0287876 A1* | 11/2012 | Kazmi | ............... | H04B 7/022 370/329 |
| 2014/0153488 A1* | 6/2014 | Koivisto | ............ | H04B 1/10 370/328 |
| 2014/0321369 A1* | 10/2014 | Davydov | ......... | H04W 36/0066 370/329 |
| 2014/0334402 A1* | 11/2014 | Chen | ................. | H04L 5/0035 370/329 |
| 2015/0029958 A1* | 1/2015 | Park | ................... | H04L 5/0053 370/329 |
| 2015/0124691 A1* | 5/2015 | Li | ........................ | H04L 5/005 370/312 |
| 2015/0382371 A1* | 12/2015 | Liu | ..................... | H04B 7/024 370/329 |
| 2016/0080094 A1* | 3/2016 | Kim | ..................... | H04L 5/001 455/63.1 |
| 2016/0080963 A1* | 3/2016 | Marinier | ............ | H04L 5/0053 370/252 |

OTHER PUBLICATIONS

International Search Report and Written Opinion—PCT/US2014/064933—ISA/EPO—Mar. 5, 2015.

\* cited by examiner

NETWORK ASSISTED INTERFERENCE CANCELLATION SIGNALING

CROSS-REFERENCE TO RELATED APPLICATIONS

This application claims benefit of U.S. Provisional Patent Application Ser. No. 61/916,037, entitled "Network Assisted Interference Cancellation Signaling," filed Dec. 13, 2013, and U.S. Provisional Patent Application Ser. No. 61/916,108, entitled "Network Assisted Interference Cancellation Signaling," filed Dec. 13, 2013, both of which are assigned to the assignee hereof and the contents of which are hereby incorporated by reference.

BACKGROUND

Field

The present disclosure relates generally to wireless communication, and more particularly, to methods and apparatus for network assisted interference cancellation (NAIC) signaling.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a user equipment. The method generally includes receiving network assisted interference cancellation information from a potentially interfering neighbor base station and performing interference cancellation, suppression or mitigation when processing a signal from a serving base station using the NAIC information.

Certain aspects of the present disclosure provide a method for wireless communications by a user equipment. The method generally includes receiving network assisted interference cancellation (NAIC) information from a potentially interfering neighbor base station on a first carrier, wherein the NAIC information is associated with a second carrier and performing interference cancellation or suppression when processing a signal from a serving base station using the NAIC information.

Certain aspects of the present disclosure provide a method for wireless communications by a user equipment. The method generally includes receiving network assisted interference cancellation (NAIC) information from a potentially interfering neighbor base station, performing interference cancellation or suppression when processing a signal from a serving base station using the NAIC information, and providing feedback regarding at least one of detection of one or more neighbor base stations conveying NAIC information or for which cell interference is cancelled.

Certain aspects of the present disclosure provide a method for wireless communications by a user equipment. The method generally includes providing an indication of a UE capability to perform interference cancellation or suppression using the NAIC information, receiving network assisted interference cancellation (NAIC) information from a potentially interfering neighbor base station, and performing interference cancellation or suppression when processing a signal from a serving base station using the NAIC information.

Certain aspects of the present disclosure provide a method for wireless communications by a user equipment. The method generally includes decoding an enhanced physical downlink control channel of the neighbor base station to obtain NAIC information from a potentially interfering neighbor base station, wherein decoding the EPCCH comprises rate matching and the rate matching is dependent on at least one of an RNTI associated with the ePDCCH, an ePDCCH set with different rate matching information mapped to different ePDCCH sets, or an ePDCCH candidate within an ePDCCH set, and performing interference cancellation or suppression when processing a signal from a serving base station using the NAIC information.

Certain aspects of the present disclosure provide a method for wireless communications by a user equipment. The method generally includes decoding an enhanced physical downlink control channel (ePDCCH) of the neighbor base station to obtain network assisted interference cancellation (NAIC) information from a potentially interfering neighbor base station, wherein decoding the ePDCCH comprises rate matching, determining an identity of the neighbor cell via at least one of a cell ID included as payload in the ePDCCH, or a mapping of ePDCCH sets to cell IDs, or mapping of ePDCCH rate matching to cell IDs, and performing interference cancellation or suppression when processing a signal from a serving base station using the NAIC information.

Certain aspects of the present disclosure provide a method for wireless communications by a user equipment. The method generally includes determining a start symbol of an enhanced physical downlink control channel (ePDCCH) with a new group cast RNTI based on at least one of: decoding a PCFICH from a potentially interfering neighbor cell, semi-static signaling, or a fixed position, decoding the ePDCCH of the neighbor base station to obtain network assisted interference cancellation (NAIC) information from a potentially interfering neighbor base station, wherein decoding the ePDCCH comprises rate matching, determining an identity of the neighbor cell via at least one of: a cell ID included as payload in the ePDCCH, a mapping of ePDCCH sets to cell IDs, or mapping of ePDCCH rate matching to cell IDs, and performing interference cancellation or suppression when processing a signal from a serving base station using the NAIC information.

Certain aspects of the present disclosure provide a method for wireless communications by a user equipment. The method generally includes receiving network assisted interference cancellation (NAIC) information from a potentially interfering neighbor base station, and performing interference cancellation or suppression when processing a signal from a serving base station using the NAIC information, wherein the NAIC information is received on one carrier and used to perform interference cancellation on a second carrier.

Certain aspects of the present disclosure provide a method for wireless communications by a user equipment. The method generally includes receiving network assisted interference cancellation (NAIC) information from a potentially interfering neighbor base station, performing interference cancellation or suppression when processing a signal from a serving base station using the NAIC information, and providing feedback regarding at least one of: detection of neighbor base station ePDCCHs conveying NAIC information or for which cell interference is cancelled.

Certain aspects of the present disclosure provide a method for wireless communications by a user equipment. The method generally includes providing, to a potentially interfering neighbor base station, an indication of the UE capability to perform interference cancellation or suppression using the network assisted interference cancellation (NAIC) information, receiving NAIC information from the potentially interfering neighbor base station, and performing interference cancellation or suppression when processing a signal from a serving base station using the NAIC information.

Certain aspects of the present disclosure provide a method for wireless communications by a base station. The method generally includes generating network assisted interference cancellation information and transmitting the NAIC information to a UE served by a neighbor base station for use in performing interference cancellation or suppression when processing a signal from the serving base station.

Certain aspects of the present disclosure provide a method for wireless communications by a user equipment. The method generally includes receiving eIMTA configuration information for a potentially interfering neighbor base station from at least one of a serving base station or the potentially interfering neighbor base station, and performing interference cancellation or suppression when processing a signal from the serving base station using the eIMTA configuration information.

Certain aspects of the present disclosure include methods of wireless communications performed by a base station corresponding or complementary to the aspects above. Aspects generally include methods, apparatus, systems, computer program products, and processing systems, as substantially described herein with reference to and as illustrated by the accompanying drawings. "LTE" refers generally to LTE and LTE-Advanced (LTE-A).

DETAILED DESCRIPTION

Figure 1:
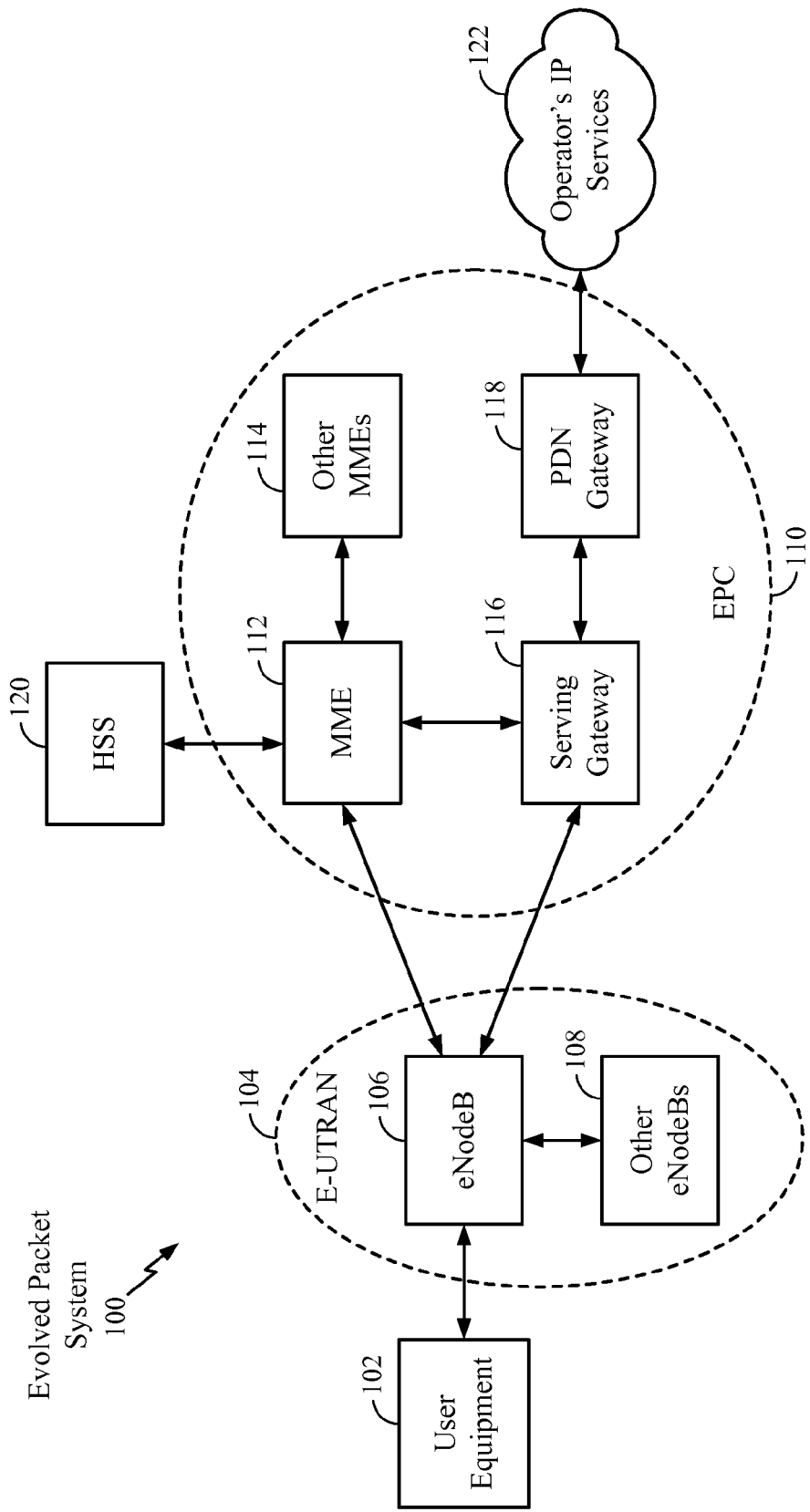
FIG. 1 is a diagram illustrating an example of a network architecture.

Network assisted interference cancellation or suppression generally allows for the network to signal interference information to UEs to aid in interference cancellation, suppression or mitigation. Signaling interference information from the network to a UE may aid the UE in performing interference cancellation, for example, by reducing the workload at the UE (e.g., reducing the workload needed for a UE to determine interference from other base stations). Aspects of the present disclosure provide methods for UEs to use interference information signaled from the network to perform interference cancellation, suppression or mitigation when processing signals received from a serving base station.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an example (e.g., LTE) network architecture 100 in which aspects of the present disclosure may be practiced. For example, UEs 102 and ENB 106 may practice interference management utilizing techniques described herein.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
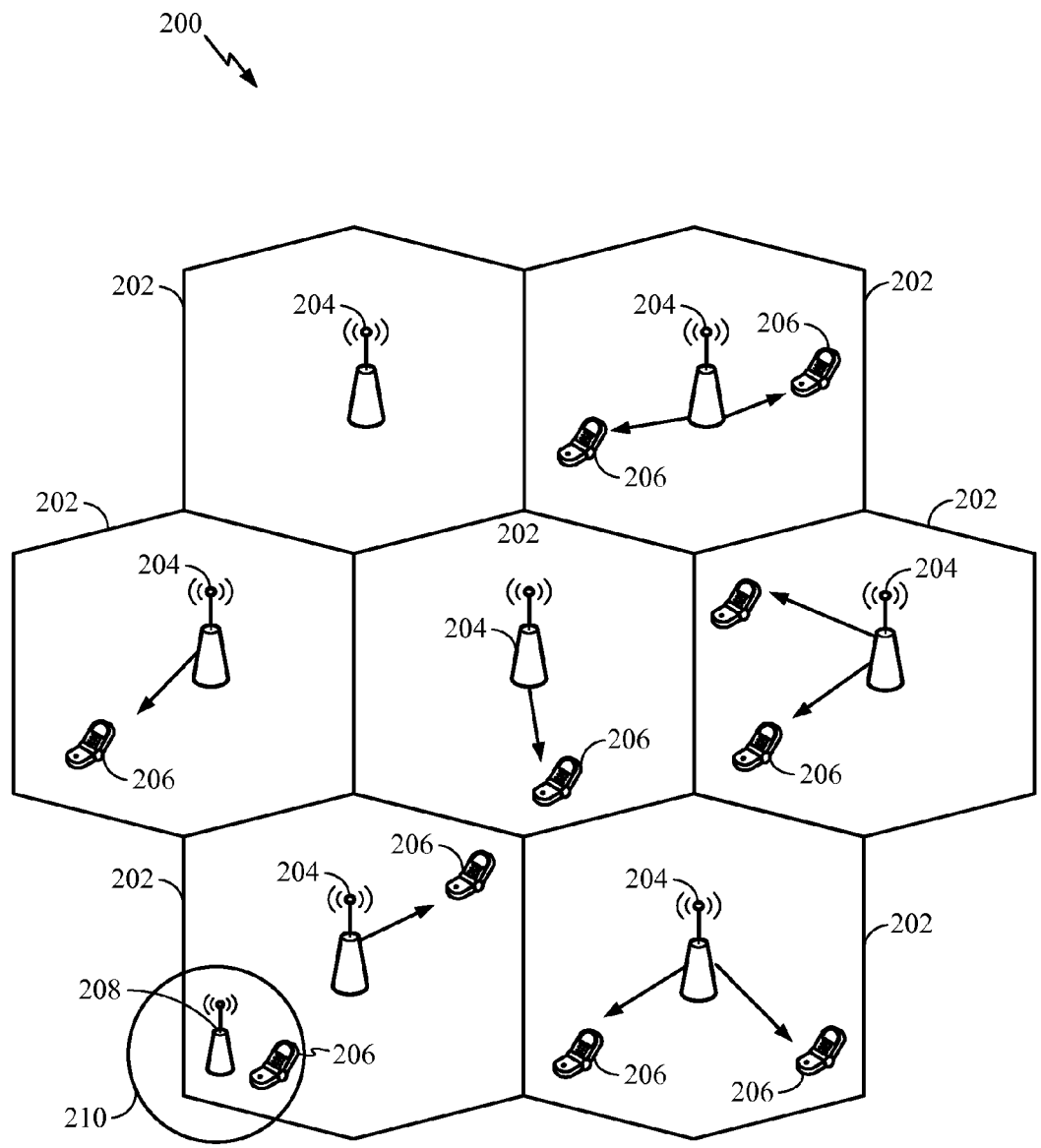
FIG. 2 is a diagram illustrating an example of an access network.

FIG. 2 is a diagram illustrating an example of an access network 200 in an LTE network architecture in which aspects of the present disclosure may be practiced. eNBs 204 and 208 may correspond to eNB 106 in FIG. 1, and UEs 206 may correspond to UE 102 in FIG. 1. UEs 206 and eNBs 204 and 208 may practice interference management techniques utilizing techniques described herein.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

Overlap between cellular regions 210 (associated with a lower power class eNB 208) and cellular regions 202 (associated with a macro eNB 204) may cause a UE serviced by one of eNBs 204 or 208 to experience interference, which may be cancelled by the UE utilizing techniques described herein. The network 200 may also include one or more relays (not shown). According to one application, an UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
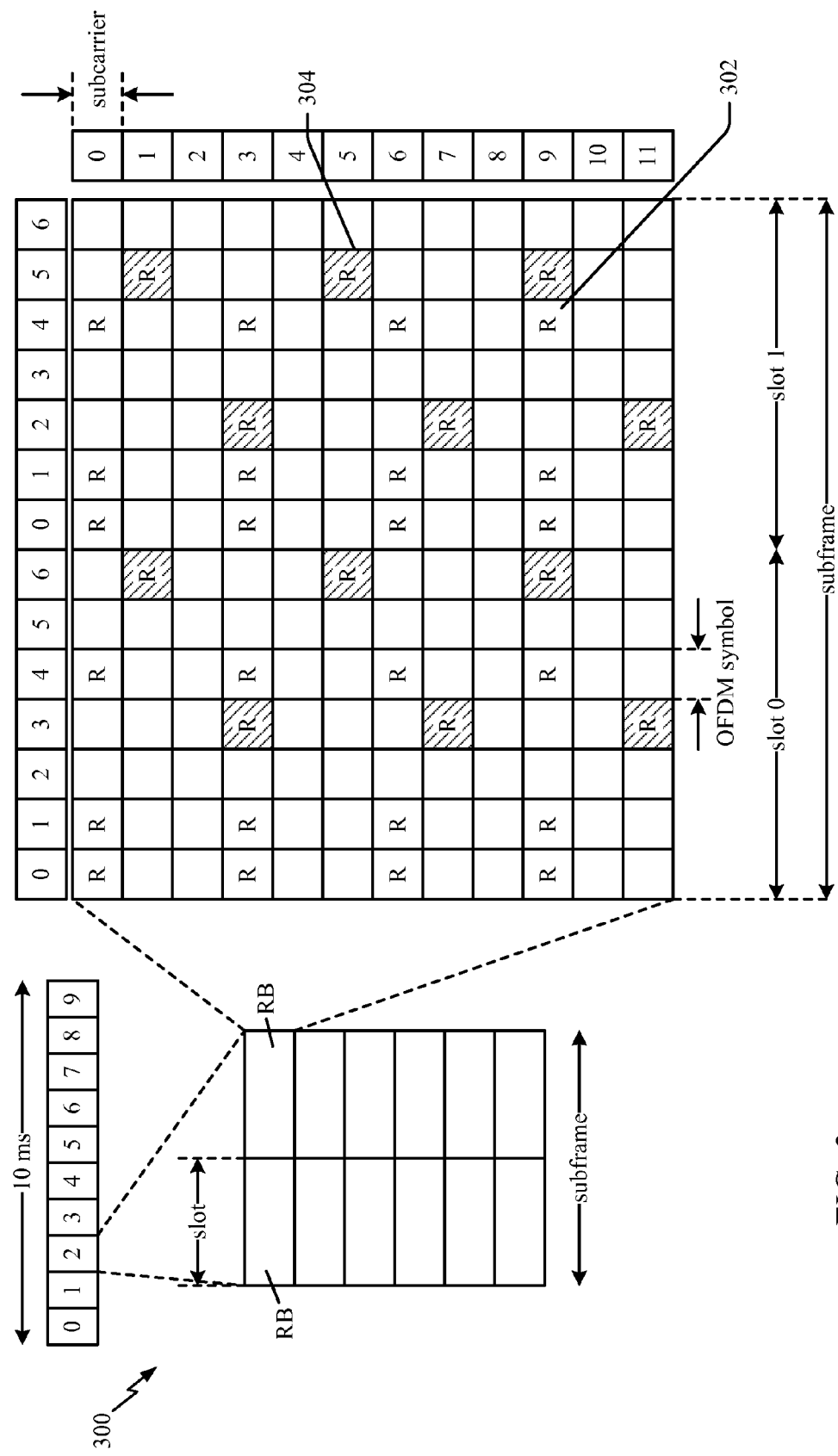
FIG. 3 is a diagram illustrating an example of a DL frame structure in LTE.

FIG. 3 is a diagram 300 illustrating an example of a DL frame structure in LTE which may be used, for example, to communicate interference management information in accordance with aspects of the present disclosure. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The PDCCH may further carry information for use by a UE in performing interference management, as described herein. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
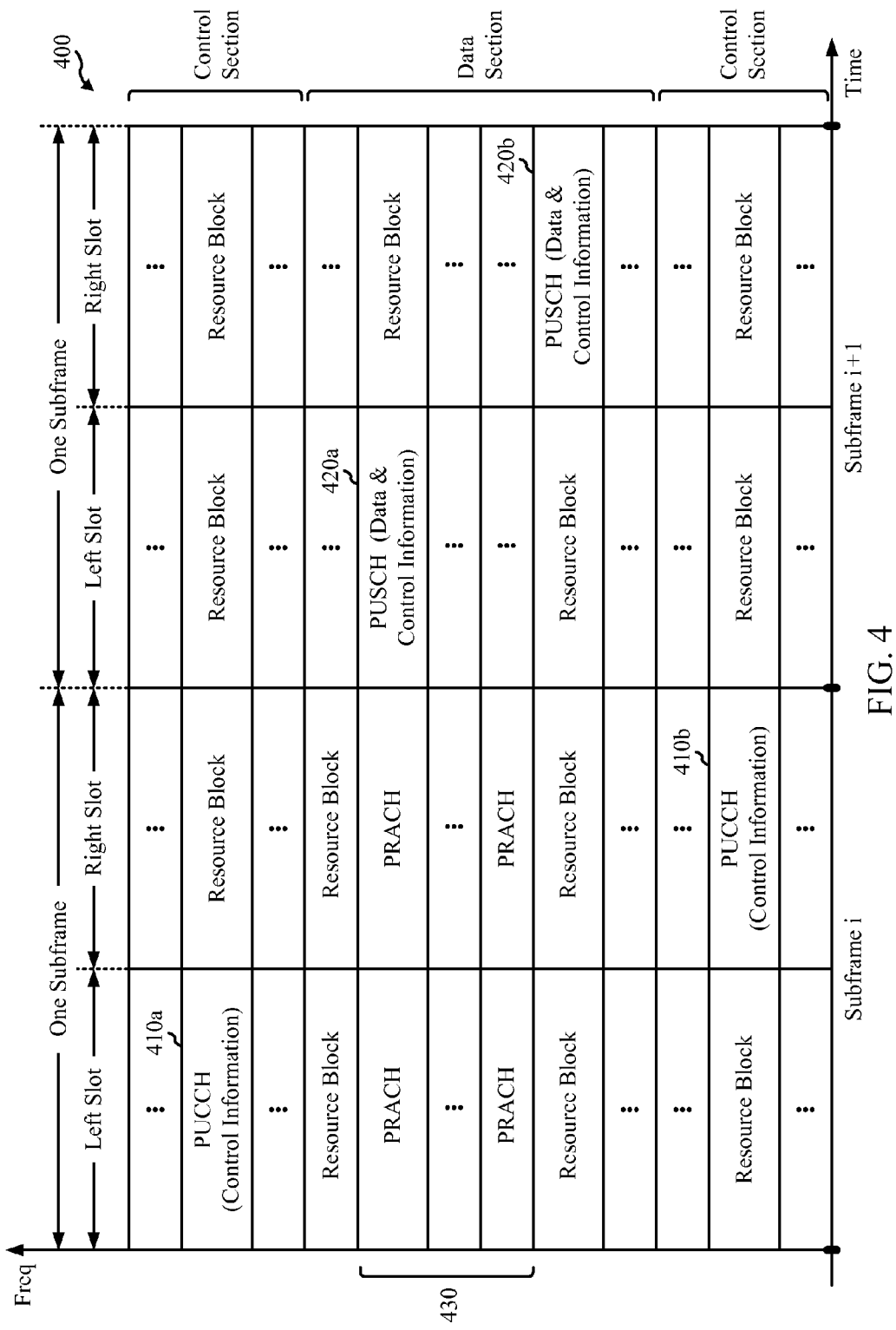
FIG. 4 is a diagram illustrating an example of an UL frame structure in LTE.

FIG. 4 is a diagram 400 illustrating an example of an UL frame structure in LTE which may be used, for example, to communicate interference management feedback in accordance with aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency. As described herein, according to certain aspects of the present disclosure, the contents of an UL transmission may include, for example, feedback relating to interference management or information relating to a capability to perform interference management using network assisted interference management information.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
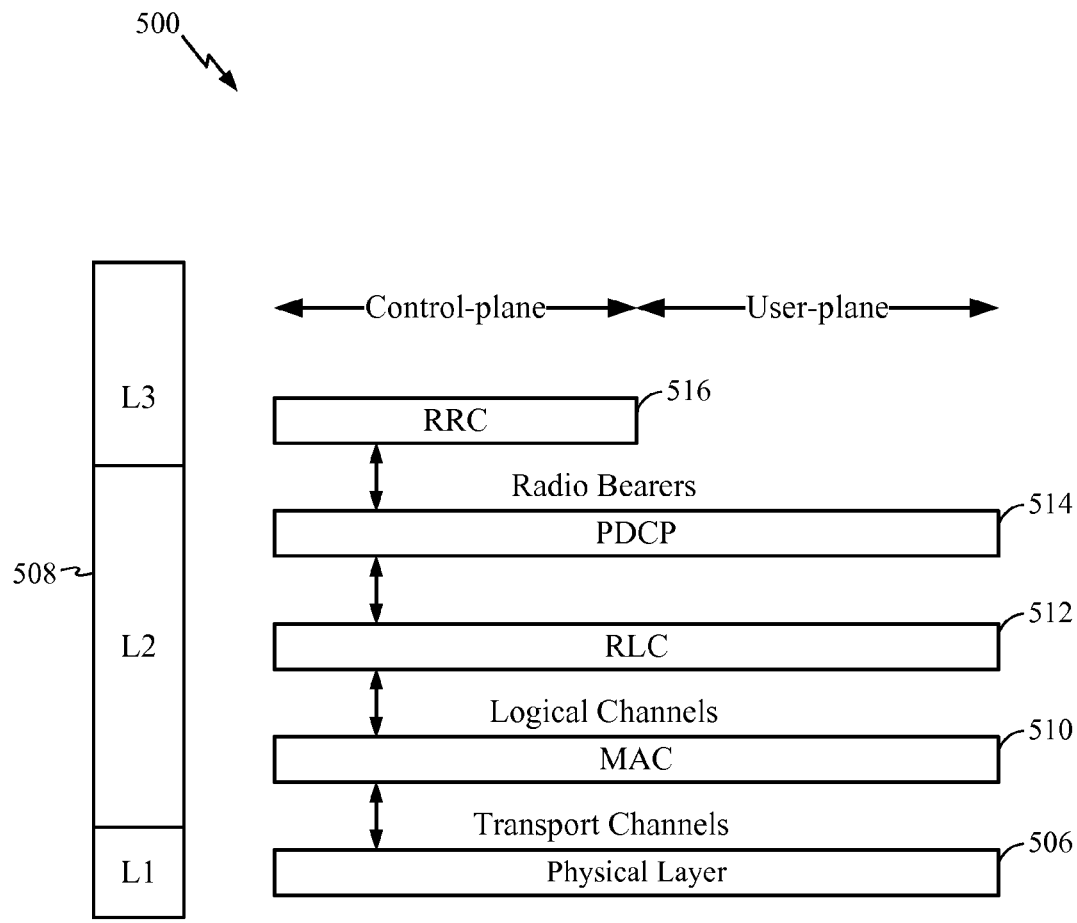
FIG. 5 is a diagram illustrating an example of a radio protocol architecture for the user and control plane.

FIG. 5 is a diagram 500 illustrating an example of a radio protocol architecture for the user and control planes in LTE that may be used for communications between UEs 102 and eNB 106, which may perform interference management according to techniques described herein. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
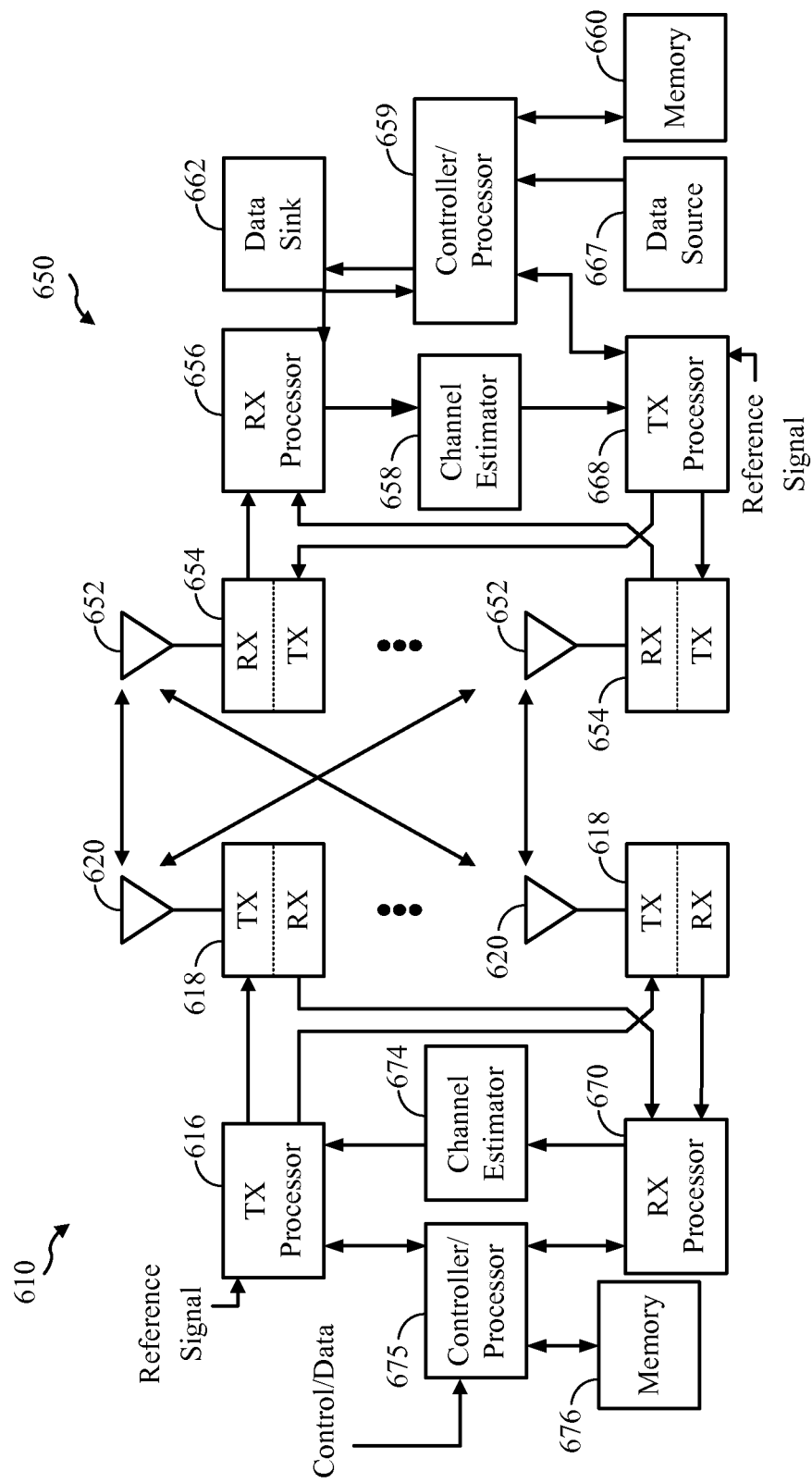
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network in which aspects of the present disclosure may be practiced. For example, eNB 610 may correspond to eNB 106 illustrated in FIG. 1, and UE 650 may correspond to UE 102 illustrated in FIG. 1. eNB 610 and UE 650 may practice interference management utilizing techniques described herein.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively. The controller/processor 659 and/or other processors and modules at the UE 650 may perform or direct operations for example operations 700 in FIG. 7, operations 800 in FIG. 8, operations 900 in FIG. 9, operations 1000 in FIG. 10, and/or other processes for the techniques described herein to use information signaled by a network to perform interference cancellation, for example. The controller/processor 675 and/or other processors and modules at the eNB 610 may perform or direct operations and/or other processes for the techniques described herein, for example. In aspects, one or more of any of the components shown in FIG. 6 may be employed to perform example operations 700, 800, 900, 1000 and/or other processes for the techniques described herein.

NETWORK ASSISTED INTERFERENCE CANCELLATION (NAIC) SIGNALING

Network assisted interference cancellation generally allows for the network to signal interference information to UEs to aid in interference cancellation, for example, by reducing the workload at the UE. Network assisted interference cancellation may be implemented, for example, on receivers supporting symbol level interference cancellation (SLIC), reduced complexity maximum likelihood (R-ML) receivers, enhanced minimum mean square error (E-MMSE-IRC) receivers, or receivers supporting codeword level interference cancellation.

NAIC signaling may be performed in a variety of manners. In some aspects, a serving cell supporting NAIC may perform semi-static signaling of interference information. In some aspects, a serving cell can dynamically signal interference information, such as modulation order, precoding matrices, and/or resource block assignments, for example. In some aspects, the interfering cell may signal interference conditions to UEs communicating with a cell experiencing interference from the interfering cell.

Figure 7:
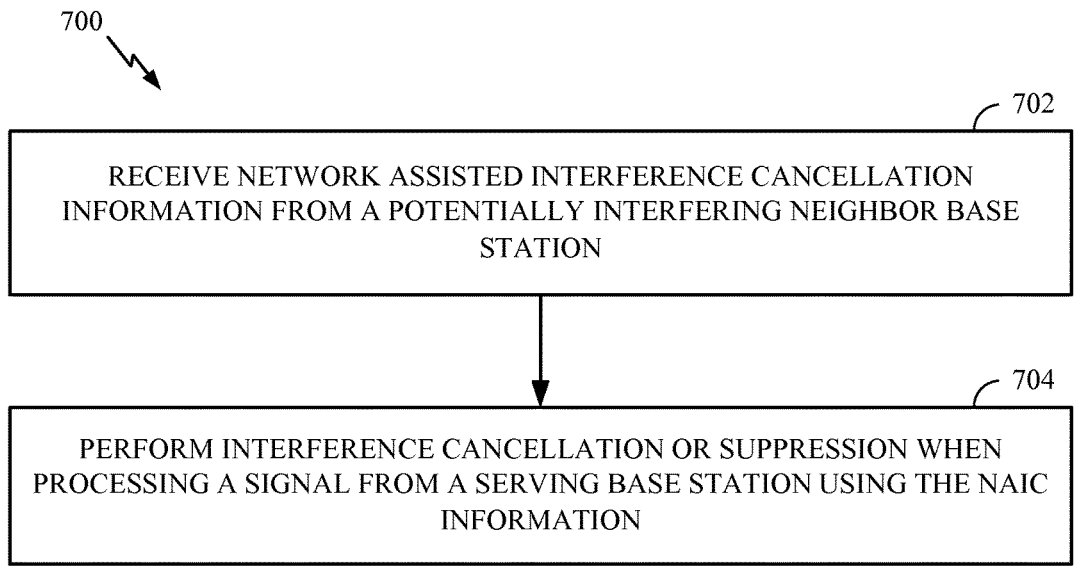
FIG. 7 illustrates example operations that may be performed by a user equipment, in accordance with an aspect of the present disclosure.

FIG. 7 illustrates example operations 700 that may be performed by a UE to perform interference cancellation or interference mitigation based on network assisted interference cancellation information in accordance with aspects of the present disclosure. Operations 700 may begin at 702, where a UE can receive network assisted interference cancellation (NAIC) information from a potentially interfering neighbor base station. At 704, the UE can perform interference cancellation or suppression when processing a signal from a serving base station using the NAIC information.

Figure 8:
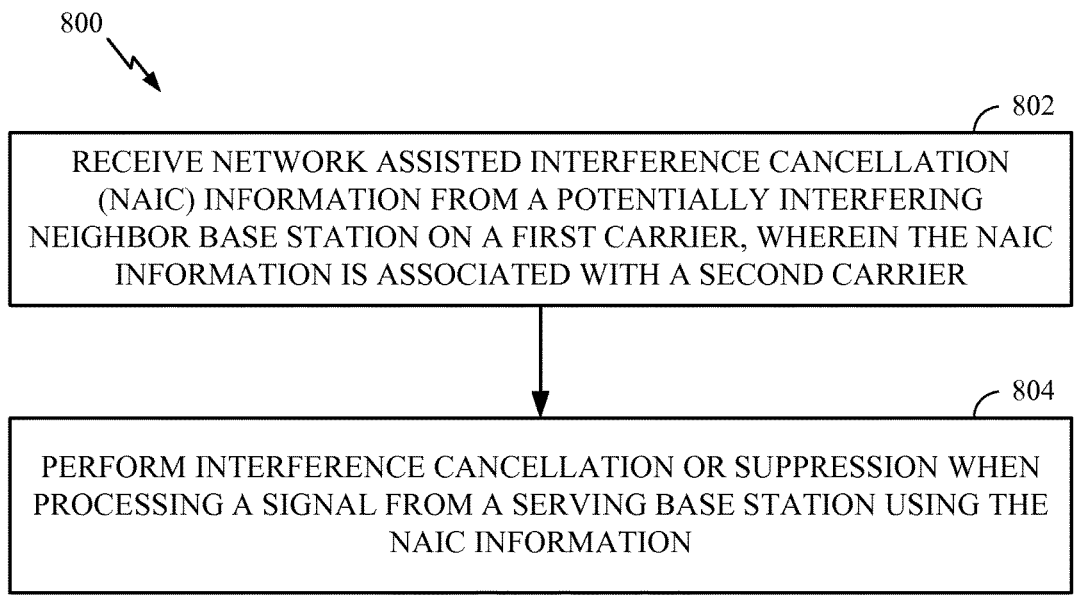
FIG. 8 illustrates example operations that may be performed by a user equipment, in accordance with an aspect of the present disclosure.

FIG. 8 illustrates example operations 800 that may be performed by an UE to perform interference cancellation or interference mitigation based on network assisted interference cancellation information in accordance with aspects of the present disclosure. Operations 800 may begin at 802, where a UE can receive network assisted interference cancellation (NAIC) information from a potentially interfering neighbor base station. The NAIC information may be received on a first carrier and may be associated with a second carrier. At 804, the UE can perform interference cancellation or suppression when processing a signal from a serving base station using the NAIC information.

Figure 9:
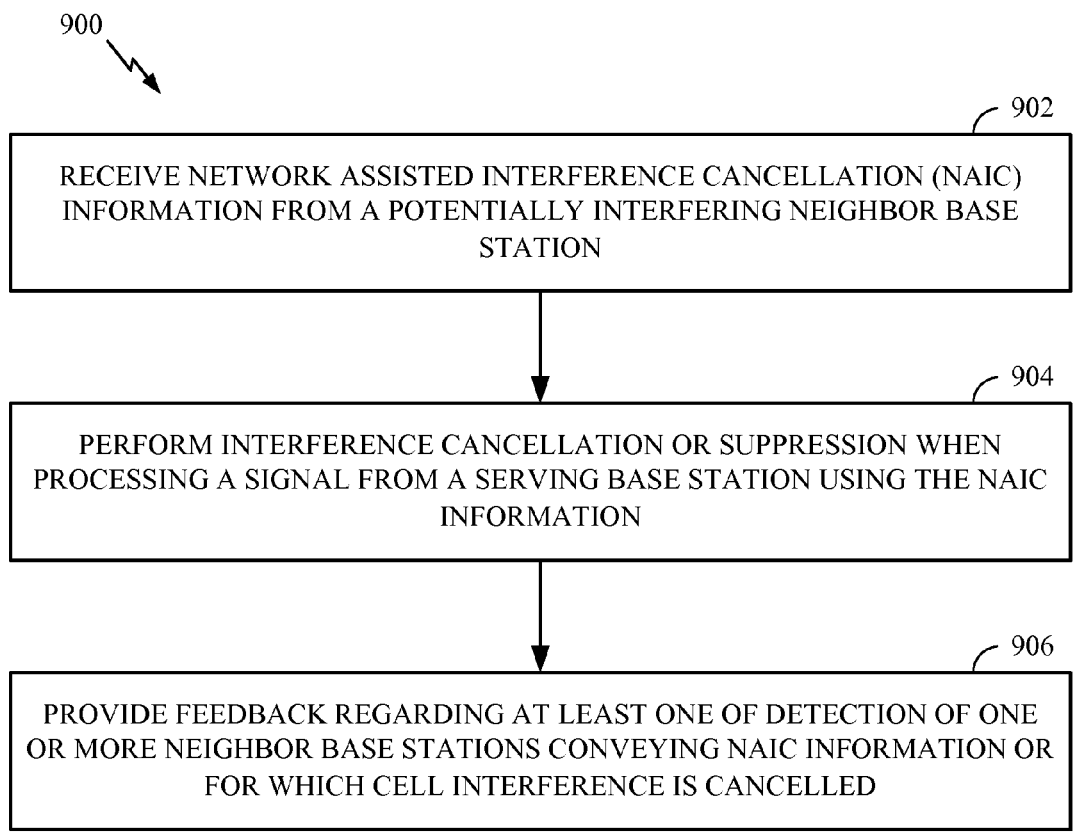
FIG. 9 illustrates example operations that may be performed by a user equipment, in accordance with an aspect of the present disclosure

FIG. 9 illustrates example operations 900 that may be performed by an UE to perform interference cancellation or interference mitigation based on network assisted interference cancellation information in accordance with aspects of the present disclosure. Operations 900 may begin at 902, where a UE can receive network assisted interference cancellation (NAIC) information from a potentially interfering neighbor base station. At 904, the UE can perform interference cancellation or suppression when processing a signal from a serving base station using the NAIC information. At 906, the UE can provide feedback regarding at least one of detection of one or more neighbor base stations conveying NAIC information or for which cell interference is cancelled.

Figure 10:
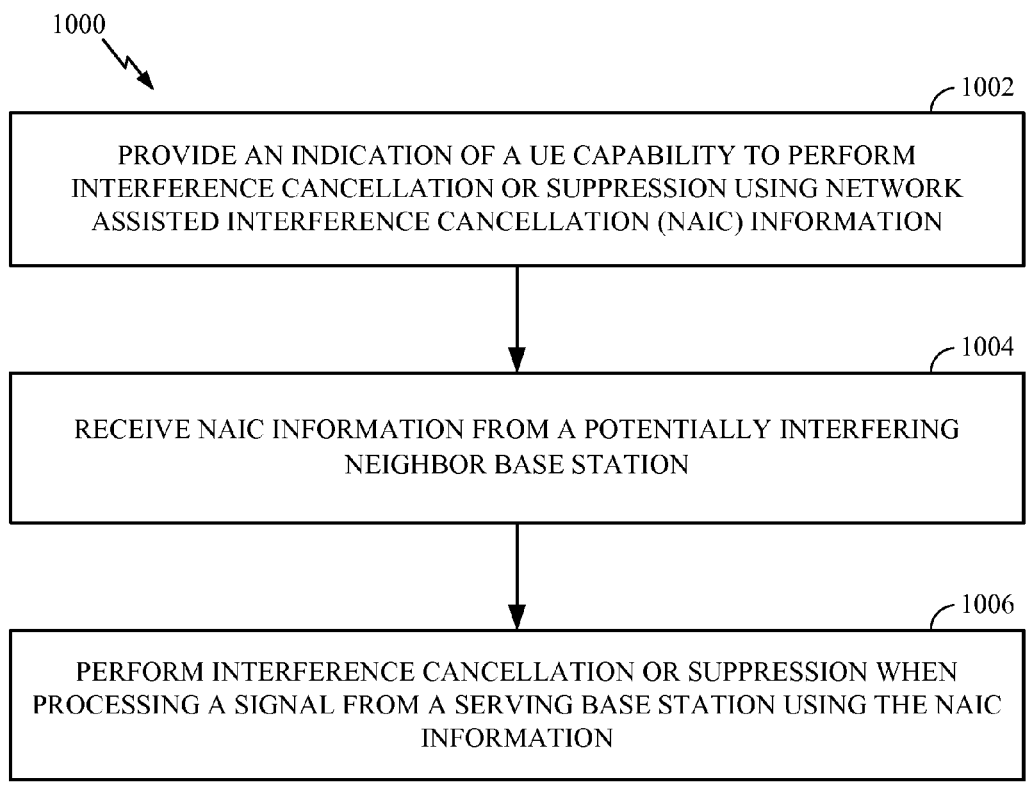
FIG. 10 illustrates example operations that may be performed by a user equipment, in accordance with an aspect of the present disclosure

FIG. 10 illustrates example operations 1000 that may be performed by an UE to perform interference cancellation or interference mitigation based on network assisted interference cancellation information in accordance with aspects of the present disclosure. Operations 1000 may begin at 1002, where a UE provides an indication of the UE's capability to perform interference cancellation or suppression using network assisted interference cancellation (NAIC) information. At 1004, the UE receives NAIC information from a potentially interfering neighbor base station. At 1006, the UE performs interference cancellation or suppression when processing a signal from a serving base station using the NAIC information.

In an aspect, in some cases a UE may receive NAIC information by decoding an enhanced physical downlink control channel (ePDCCH) of the neighbor base station. An ePDCCH is transmitted by rate matching around other signals, such as CSI-RS. The rate matching may be set, for example, according to values defined in a standard. In order to correctly decode an ePDCCH, a receiving UE typically needs to have rate mapping information for the ePDCCH. However, if the ePDCCH is transmitted from a neighbor cell, the UE may not know the rate matching information unless it is signaled or specified by the standard. In an aspect, rate matching can be dependent on a radio network temporary identifier (RNTI) (e.g., associated with the ePDCCH). An ePDCCH intended to signal for the users in another cell can use a special group RNTI, such as a G-RNTI. In a groupcast or broadcast with a new G-RNTI, the UE may not need to rate match around a common reference signal (CRS) or channel state information reference signal (CSI-RS). This way, users from other cells can detect an ePDCCH with G-RNTI without the knowledge of detailed configurations of a CRS or CSI-RS. On the other hand, the regular ePDCCH intended for UEs being served by the base station transmitting the regular ePDCCH, such as ePDCCH with C-RNTI, can continue to follow the same rate matching information (e.g., the values set by a standard). Rate matching based on an RNTI may cause some performance degradation from puncturing. This performance degradation may be acceptable, for example, for strong transmission signals. In an aspect, rate matching may be dependent on mapping an ePDCCH set with different rate matching information to different ePDCCH sets. For example, an ePDCCH set can be matched to interfering cells for broadcasting or group-casting information. In mapping rate matching information to a different set, a UE may perform blind detection of more than one format. In aspects, rate matching information may be mapped to an ePDCCH candidate. In aspects, rate matching information may be mapped to one or more cell IDs. In an aspect, rate matching may comprise matching an ePDCCH candidate within an ePDCCH set. For example, for the same ePDCCH decoding candidate, two or more rate matching possibilities may be configured for the UE. In an aspect, some ePDCCH candidates may use a first rate matching possibility for a first cell, and other ePDCCH candidates can use at least a second rate matching configuration for one or more other ePDCCH decoding candidates for one or more other cells.

Decoding an ePDCCH of a neighbor base station may include determining an identity of a neighbor cell. In an aspect, determining an identity of the neighbor cell may be performed by detecting a cell ID included as a data payload in the ePDCCH. For example, a cell ID included in an ePDCCH payload may be a virtual cell ID (VCID). In an aspect, determining an identity of the neighbor cell may entail mapping ePDCCH sets to cell IDs (e.g., respectively). Mapping ePDCCH sets to interfering cells (e.g., respectively) may be performed for broadcasting or group casting information. A mapping may be signaled to a UE semi-statically, and UEs may perform blind detection of more than one format.

When a UE decodes an ePDCCH of a neighbor or interfering cell (e.g., an ePDCCH with a groupcast RNTI), the UE may need to determine the starting symbol of the ePDCCH. In an aspect, determining the starting symbol of an ePDCCH may be based on decoding a physical control format indicator channel (PCFICH) from the neighbor cell. In an aspect, a neighbor or interfering cell may semi-statically signal information about a starting symbol. For example, a cell may signal the starting symbol or a fixed position of an ePDCCH with the G-RNTI. In aspects, an ePDCCH with a G-RNTI intended for signaling to users in other cells, such as for NAIC, does not need to have the same start symbol position as another ePDCCH from the same cell.

In aspects, quasi-colocation information may be determined for the neighbor base station (e.g., while performing ePDCCH detection). Quasi-colocation information may be used to perform, for example, time and/or frequency tracking for decoding the ePDCCH of a neighbor or interfering cell. In an aspect, determining quasi-colocation information for a neighbor base station may be based on a signaled set of CSI-RS (e.g., transmitted by the neighbor base station). The UE can be signaled a CSI-RS configuration from the neighbor cell in order to perform time/frequency tracking for the decoding of signals transmitted from that neighbor cell.

NAIC may be used to perform interference cancellation across carriers, for example, where carrier aggregation is being used. In an aspect, NAIC information may be received on a first carrier and used to perform interference cancellation on a second carrier. Cross carrier signaling may be performed dynamically, for example, with transmissions on an ePDCCH. In an aspect, NAIC information having interference information for a second carrier can be received via radio resource control (RRC) signaling. When carrier aggregation is being used, the Pcell can signal the interference condition on Scell in a dynamic (e.g. ePDCCH or PDCCH with cross carrier signaling) or semistatic manner (e.g. via RRC signaling).

A cell may signal interference information in various manners. For example, NAIC information may be signaled dynamically in one or more subframes. In an aspect, NAIC information may be dynamically signaled with some periodicity. For example, this may entail signaling to a UE which subframes to monitor for ePDCCH using G-RNTI. In an aspect, dynamic signaling with periodicity may entail defining a persistent window during which the signaled interference information may be deemed to be valid. In an aspect, when the interfering signal is semi persistently scheduled, the information on semi persistently scheduled data can be signaled for NAIC. NAIC information may be received signaled with semi-persistent scheduling (SPS). Where an eNB uses semi-persistent scheduling, the eNB may signal persistent assignment information to other cells for cancellation.

Various means may be used to ensure ePDCCH coverage and interference cancellation. In an aspect, an ePDCCH may be sent using a fixed aggregation level. In an aspect, a UE may signal interference cancellation feedback to a serving cell. Feedback may comprise detection of neighbor base station ePDCCHs conveying NAIC information or information identifying the cell interference that is being cancelled. Feedback may comprise long-term feedback or short-term feedback. In an aspect, the long-term feedback or short-term feedback may include reporting differential channel state information (e.g., reporting channel state information with and without interference cancellation or suppression) for different cells. In aspects, a UE can report differential CSI with cancellation along with the information on which cell is cancelled. Feedback may include, for example, an indication of whether interference is being cancelled. Indications of whether interference is being cancelled may comprise one or more bits (e.g., a single bit together with the ACK/NACK bits transmitted for HARQ). In aspects, an eNB may schedule interference management resources (IMR), which reflects an IC decision. For example, the IMR may use the same PMI and modulation order as the remaining interference.

A UE may be configured to provide information to an eNB regarding the UE's capability to perform interference cancellation or suppression using NAIC information. The information provided by a UE regarding its capability to perform interference cancellation or suppression using NAIC information may include information regarding restrictions resulting from, for example, at least one of whether carrier aggregation is enabled, the modulation scheme employed, the rank of a downlink assignment, or a CoMP set size. For example, when carrier aggregation is enabled, a UE may signal that NAIC is supported on a subset of component carriers. For example, if a UE is using QAM-256, the UE may signal that NAIC is not supported. In an aspect where a downlink assignment has a rank exceeding a defined rank threshold, the UE may signal that NAIC is not performed, for example. In an aspect where a coordinated multipoint set size exceeds a defined set size, the UE may signal that NAIC is not performed, for example. Another alternative is for UE to signal its capability to perform interference cancellation or suppression using NAIC information in some combination from above mentioned features. For example, UE can signal the capability of NAIC of up to 2 component carriers, or capability of NAIC of up to a CoMP set size of 2.

The aforementioned signaling techniques may be extended beyond network assisted interference cancellation. For example, the signaling techniques may be extended to implementations of enhanced interference mitigation and traffic adaptation (eIMTA). For example, the aforementioned signaling techniques may be used by a neighbor cell directly broadcasting or group-casting information about an eIMTA configuration. Signaling periodicity of eIMTA may be matched to the eIMTA re-configuration period. The aforementioned signaling techniques may be used to link a cell's eIMTA to a power control loop. A UE may perform uplink interference cancellation on another user's uplink signal in a downlink subframe depending on the TDD configuration of a neighbor cell. Although the aspects above describe NAIC information or eIMTA configuration information regarding a potentially interfering base station being received from the potentially interfering base station, in aspects such information may be received from via a serving base station.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications performed by a user equipment (UE), comprising:
   receiving network assisted interference cancellation (NAIC) information from a potentially interfering neighbor base station, wherein receiving the NAIC information comprises decoding an enhanced physical downlink control channel (ePDCCH) of the neighbor base station, and wherein decoding the ePDCCH comprises rate matching, wherein the rate matching is dependent on at least one of:
      a Radio Network Temporary Identifier (RNTI) associated with the ePDCCH, rate matching information mapped to an ePDCCH set including the ePDCCH, or
      an ePDCCH decoding candidate within an ePDCCH set, and
   wherein at least one of:
      the UE is configured with two or more rate matching possibilities for a same ePDCCH decoding candidate; or
      the UE is configured to use a first rate matching configuration for one or more ePDCCH decoding candidates for one cell and to use a second rate matching configuration for one or more other ePDCCH decoding candidates for another cell; and
   performing interference cancellation or suppression when processing a signal from a serving base station using the NAIC information.

2. The method of claim 1, further comprising determining an identity of the neighbor base station via at least one of:
   a cell ID included as payload in the ePDCCH;
   a mapping of ePDCCH sets to cell IDs; or
   a mapping of ePDCCH rate matching to cell IDs.

3. The method of claim 1, further comprising determining quasi-colocation information for the neighbor base station based on a signaled set of channel state information reference signals (CSI-RS).

4. The method of claim 1, further comprising determining a start symbol of the ePDCCH with a new group cast RNTI based on at least one of:
   decoding a Physical Control Format Indicator Channel (PCFICH) from the neighbor base station;
   semi-statically signaling of a start symbol of the ePDCCH; or
   a fixed position of the ePDCCH.

5. The method of claim 4, wherein the ePDCCH with group cast RNTI carrying NAIC information does not need to have the same start symbol as other ePDCCH transmissions from the neighbor base station.

6. The method of claim 1, wherein the NAIC information is received via:
   dynamic signaling in one or more subframes;
   dynamic signaling with some periodicity; or
   semi-persistent scheduling (SPS).

7. The method of claim 1, further comprising:
   providing feedback regarding at least one of detection of one or more neighbor base stations conveying NAIC information or for which cell interference is cancelled.

8. The method of claim 7, wherein providing feedback regarding detection of one or more neighbor base station conveying NAIC information comprises detecting an enhanced physical downlink control channel (ePDCCH) conveying NAIC information from the one or more neighbor base station.

9. The method of claim 8, wherein the ePDCCH is sent using a fixed aggregation level.

10. The method of claim 7, wherein the feedback is long term feedback or short term feedback and providing feedback comprises reporting differential channel state information with and without cancellation.

11. The method of claim 7, wherein providing feedback for which cell interference is cancelled comprises providing long term feedback or short term feedback for which cell interference is cancelled.

12. The method of claim 7, wherein providing feedback for which cell interference is cancelled comprises providing feedback based on interference management resources (IMR) assigned by one or more base stations.

13. A method of wireless communications performed by a user equipment (UE), comprising:
   receiving network assisted interference cancellation (NAIC) information from a potentially interfering neighbor base station on a first carrier, wherein the NAIC information is associated with a second carrier, wherein receiving the NAIC information comprises decoding an enhanced physical downlink control channel (ePDCCH) of the neighbor base station, and wherein decoding the ePDCCH comprises rate matching, wherein the rate matching is dependent on at least one of:
      a Radio Network Temporary Identifier (RNTI) associated with the ePDCCH, rate matching information mapped to an ePDCCH set including the ePDCCH, or
      an ePDCCH decoding candidate within an ePDCCH set, and
   wherein at least one of:
      the UE is configured with two or more rate matching possibilities for a same ePDCCH decoding candidate; or
      the UE is configured to use a first rate matching configuration for one or more ePDCCH decoding candidates for one cell and to use a second rate matching configuration for one or more other ePDCCH decoding candidates for another cell; and
   performing interference cancellation or suppression when processing a signal from a serving base station using the NAIC information.

14. A method of wireless communications, comprising:
   providing an indication of a user equipment (UE) capability to perform interference cancellation or suppression using network assisted interference cancellation (NAIC) information;
   receiving the NAIC information from a potentially interfering neighbor base station, wherein receiving the NAIC information comprises decoding an enhanced physical downlink control channel (ePDCCH) of the neighbor base station, and wherein decoding the ePDCCH comprises rate matching, wherein the rate matching is dependent on at least one of:
      a Radio Network Temporary Identifier (RNTI) associated with the ePDCCH, rate matching information mapped to an ePDCCH set including the ePDCCH, or
      an ePDCCH decoding candidate within an ePDCCH set, and
   wherein at least one of:

the UE is configured with two or more rate matching possibilities for a same ePDCCH decoding candidate; or the UE is configured to use a first rate matching configuration for one or more ePDCCH decoding candidates for one cell and to use a second rate matching configuration for one or more other ePDCCH decoding candidates for another cell; and performing interference cancellation or suppression when processing a signal from a serving base station using the NAIC information.

15. The method of claim 14, wherein the UE is restricted, in some manner, from utilizing one or more processing techniques when supporting interference cancellation or suppression using the NAIC information based on at least one of whether carrier aggregation is enabled, a modulation scheme employed, a rank of a downlink assignment, or a coordinated multipoint (CoMP) set size.

16. The method of claim 15, wherein the restriction comprises supporting NAIC on a subset of component carriers if carrier aggregation is enabled.

17. An apparatus for wireless communications, comprising:

a receiver configured to:
receive network assisted interference cancellation (NAIC) information from a potentially interfering neighbor base station, wherein receiving the NAIC information comprises decoding an enhanced physical downlink control channel (ePDCCH) of the neighbor base station, and wherein decoding the ePDCCH comprises rate matching, wherein the rate matching is dependent on at least one of:

a Radio Network Temporary Identifier (RNTI) associated with the ePDCCH, rate matching information mapped to an ePDCCH set including the ePDCCH, or an ePDCCH decoding candidate within an ePDCCH set, and wherein at least one of:

the apparatus is configured with two or more rate matching possibilities for a same ePDCCH decoding candidate; or the apparatus is configured to use a first rate matching configuration for one or more ePDCCH decoding candidates for one cell and to use a second rate matching configuration for one or more other ePDCCH decoding candidates for another cell; and a processor configured to:
perform interference cancellation or suppression when processing a signal from a serving base station using the NAIC information.

18. The apparatus of claim 17, wherein the processor is further configured to determine quasi-colocation information for the neighbor base station based on a signaled set of channel state information reference signals (CSI-RS).

19. The apparatus of claim 17, wherein the receiver is configured to receive the NAIC information via:
dynamic signaling in one or more subframes;
dynamic signaling with some periodicity; or
semi-persistent scheduling (SPS).

20. The apparatus of claim 17, further comprising a transmitter configured to provide feedback regarding at least one of detection of one or more neighbor base stations conveying NAIC information or for which cell interference is cancelled.

21. The apparatus of claim 20, wherein providing feedback regarding detection of one or more neighbor base station conveying NAIC information comprises detecting an enhanced physical downlink control channel (ePDCCH) conveying NAIC information from the one or more neighbor base station.

22. The apparatus of claim 20, wherein providing feedback for which cell interference is cancelled comprises providing long term feedback or short term feedback for which cell interference is cancelled.

23. The apparatus of claim 20, wherein providing feedback for which cell interference is cancelled comprises providing feedback based on interference management resources (IMR) assigned by one or more base stations.

* * * * *